(12) United States Patent
Busch et al.

(10) Patent No.: US 11,748,607 B2
(45) Date of Patent: Sep. 5, 2023

(54) SYSTEMS AND METHODS FOR PARTIAL DIGITAL RETRAINING

(71) Applicant: Syntiant, Aliso Viejo, CA (US)

(72) Inventors: Kurt F. Busch, Laguna Hills, CA (US); Jeremiah H. Holleman, III, Irvine, CA (US); Pieter Vorenkamp, Laguna Beach, CA (US); Stephen W. Bailey, Irvine, CA (US)

(73) Assignee: Syntiant, Aliso Viejo, CA (US)

( * ) Notice: Subject to any disclaimer, the term of this patent is extended or adjusted under 35 U.S.C. 154(b) by 1423 days.

(21) Appl. No.: 16/048,099

(22) Filed: Jul. 27, 2018

(65) Prior Publication Data

US 2019/0034790 A1 Jan. 31, 2019

Related U.S. Application Data

(60) Provisional application No. 62/539,384, filed on Jul. 31, 2017.

(51) Int. Cl.
*G06N 3/06* (2006.01)
*G06F 17/18* (2006.01)
*G06N 3/08* (2023.01)
*G06N 5/04* (2023.01)
*G06N 3/10* (2006.01)
(Continued)

(52) U.S. Cl.
CPC ............ *G06N 3/065* (2023.01); *G06F 17/18* (2013.01); *G06N 3/08* (2013.01); *G06N 3/105* (2013.01); *G06N 5/046* (2013.01)

(58) Field of Classification Search
CPC ........ G06N 3/0635; G06N 3/08; G06N 3/105; G06N 5/046
See application file for complete search history.

(56) References Cited

U.S. PATENT DOCUMENTS

2003/0200189 A1* 10/2003 Meng ............... G06N 3/082
706/26
2006/0036559 A1* 2/2006 Nugent ............... G06N 3/08
706/23

(Continued)

OTHER PUBLICATIONS

PCT Search Report, PCT/US 18/44260, dated Nov. 23, 2018.

*Primary Examiner* — Ann J Lo
*Assistant Examiner* — Van C Mang
(74) *Attorney, Agent, or Firm* — Hani Sayed; Ravi Mohan; Rutan & Tucker, LLP

(57) ABSTRACT

Provided herein is an integrated circuit including, in some embodiments, a hybrid neural network including a plurality of analog layers, a digital layer, and a plurality of data outputs. The plurality of analog layers is configured to include programmed weights of the neural network for decision making by the neural network. The digital layer, disposed between the plurality of analog layers and the plurality of data outputs, is configured for programming to compensate for weight drifts in the programmed weights of the neural network, thereby maintaining integrity of the decision making by the neural network. Also provided herein is a method including, in some embodiments, programming the weights of the plurality of analog layers; determining the integrity of the decision making by the neural network; and programming the digital layer of the neural network to compensate for the weight drifts in the programmed weights of the neural network.

16 Claims, 7 Drawing Sheets

(51) Int. Cl.
*G06N 3/065* (2023.01)
*G06N 5/046* (2023.01)

(56) References Cited

U.S. PATENT DOCUMENTS

| | | |
|---|---|---|
| 2010/0277232 A1 | 11/2010 | Snider |
| 2011/0119215 A1* | 5/2011 | Elmegreen ............ G06N 3/0635 |
| | | 706/37 |
| 2014/0019392 A1* | 1/2014 | Buibas ..................... G06N 3/04 |
| | | 706/23 |
| 2016/0098630 A1 | 4/2016 | Sornborger et al. |

* cited by examiner

Earlier analog layers of the hybrid neural network project data into separable regions. The final digital layer find the correct projection of the boundary line.

Weight drifts in the analog layers distort projection. Misclassifications result.

Adjust weights in the final digital layer for a new correct projection of the boundary line.

SYSTEMS AND METHODS FOR PARTIAL DIGITAL RETRAINING

PRIORITY

This application claims the benefit of priority to U.S. Provisional Patent Application No. 62/539,384, filed Jul. 31, 2017, titled "Systems and Methods for Partial Digital Retraining," which is hereby incorporated by reference into this application in its entirety.

FIELD

Embodiments of the disclosure are related to the field of neuromorphic computing. More specifically, embodiments of the disclosure relate to, but are not limited to, systems and methods for partial digital retraining of artificial neural networks disposed in analog multiplier arrays of neuromorphic integrated circuits.

BACKGROUND

Traditional central processing units ("CPUs") process instructions based on "clocked time." Specifically, CPUs operate such that information is transmitted at regular time intervals. Based on complementary metal-oxide-semiconductor ("CMOS") technology, silicon-based chips may be manufactured with more than 5 billion transistors per die and with features as small as 10 nm. Advances in CMOS technology have been parlayed into advances in parallel computing, which is used ubiquitously in cell phones and personal computers containing multiple processors.

However, as machine learning is becoming commonplace for numerous applications including bioinformatics, computer vision, video games, marketing, medical diagnostics, online search engines, etc., traditional CPUs are often not able to supply a sufficient amount of processing capability while keeping power consumption low. In particular, machine learning is a subsection of computer science directed to software having the ability to learn from and make predictions on data. Furthermore, one branch of machine learning includes deep learning, which is directed at utilizing deep (multilayer) neural networks.

Currently, research is being done to develop direct hardware implementations of deep neural networks, which may include systems that attempt to simulate "silicon" neurons (e.g., "neuromorphic computing"). Neuromorphic chips (e.g., silicon computing chips designed for neuromorphic computing) operate by processing instructions in parallel (e.g., in contrast to traditional sequential computers) using bursts of electric current transmitted at non-uniform intervals. As a result, neuromorphic chips require far less power to process information, specifically, artificial intelligence ("AI") algorithms. To accomplish this, neuromorphic chips may contain as much as five times as many transistors as a traditional processor while consuming up to 2000 times less power. Thus, the development of neuromorphic chips is directed to provide a chip with vast processing capabilities that consumes far less power than conventional processors. Further, neuromorphic chips are designed to support dynamic learning in the context of complex and unstructured data.

Artificial neural networks disposed in analog multiplier arrays of neuromorphic integrated circuits can be subject to electrostatic discharge of synaptic weights that affects decision-making capabilities of the artificial neural networks. Provided herein are systems and methods for partial digital retraining of artificial neural networks including a digital layer in addition to analog layers. The partial digital retraining obviates reprogramming the artificial neural networks to compensate for the electrostatic discharge of the synaptic weights, thereby maintaining the decision-making capabilities of such artificial neural networks.

SUMMARY

Disclosed herein is a neuromorphic integrated circuit including, in some embodiments, a multi-layered analog-digital hybrid neural network. The neural network includes a number of analog layers configured to include synaptic weights between neural nodes of the neural network for decision making by the neural network. The neural network also includes at least one digital layer. The digital layer is configured for programmatically compensating for weight drifts of the synaptic weights of the neural network, thereby maintaining integrity of the decision making by the neural network.

In some embodiments, the number of analog layers is disposed between a number of data inputs and the digital layer. The digital layer is disposed between the number of analog layers and a number of data outputs.

In some embodiments, the neural network is configured for one or more classification problems, one or more regression problems, or a combination thereof.

In some embodiments, the decision making by the neural network includes predicting continuous quantities for one or more regression problems. The digital layer through its configuration for programmatically compensating for weight drifts of the synaptic weights of the neural network is further configured to maintain a correctly fitted regression line for predicting the continuous quantities by the neural network.

In some embodiments, the decision making by the neural network includes predicting discrete classes for one or more classification problems. The digital layer through its configuration for programmatically compensating for weight drifts of the synaptic weights of the neural network is further configured to maintain a correctly projected decision boundary for predicting the discrete classes by the neural network.

In some embodiments, the neuromorphic integrated circuit further includes a test data generator configured to generate test data on a periodic basis for testing the integrity of the decision making by the neural network.

In some embodiments, the number of analog layers is disposed in an analog multiplier array of two-quadrant multipliers in a memory sector of the neuromorphic integrated circuit.

In some embodiments, the neuromorphic integrated circuit is configured to operate on battery power.

Also disclosed herein is a neuromorphic integrated circuit including, in some embodiments, a multi-layered analog-digital hybrid neural network and a test data generator configured to generate test data on a periodic basis for testing the integrity of the decision making by the neural network. The neural network includes a number of analog layers configured to include synaptic weights between neural nodes of the neural network for decision making by the neural network. The neural network also includes at least one digital layer. The digital layer is configured for programmatically compensating for weight drifts of the synaptic weights of the neural network, thereby maintaining integrity of the decision making by the neural network.

In some embodiments, the decision making by the neural network includes predicting continuous quantities for one or more regression problems. The digital layer through its configuration for programmatically compensating for weight drifts of the synaptic weights of the neural network is further configured to maintain a correctly fitted regression line for predicting the continuous quantities by the neural network.

In some embodiments, the decision making by the neural network includes predicting discrete classes for one or more classification problems. The digital layer through its configuration for programmatically compensating for weight drifts of the synaptic weights of the neural network is further configured to maintain a correctly projected decision boundary for predicting the discrete classes by the neural network.

In some embodiments, the number of analog layers is disposed between a number of data inputs and the digital layer. The digital layer is disposed between the number of analog layers and a number of data outputs.

In some embodiments, the number of analog layers is disposed in an analog multiplier array of two-quadrant multipliers in a memory sector of the neuromorphic integrated circuit.

In some embodiments, the neuromorphic integrated circuit is configured for one or more application specific standard products ("ASSPs") selected from keyword spotting, voice recognition, one or more audio filters, speech enhancement, gesture recognition, image recognition, video object classification and segmentation, and autonomous vehicles including drones.

In some embodiments, the neuromorphic integrated circuit is configured to operate on battery power.

Also disclosed is a method for a neuromorphic integrated circuit including, in some embodiments, programming synaptic weights of a number of analog layers of a multi-layered analog-digital hybrid neural network of the neuromorphic integrated circuit for decision making by the neural network; periodically testing an integrity of the decision making by the neural network using test data generated by a test data generator of the neuromorphic integrated circuit; and programming a digital layer of the neural network to compensate for weight drifts in the synaptic weights of the analog layers of the neural network, thereby maintaining integrity of the decision making by the neural network.

In some embodiments, the method further includes predicting continuous quantities for one or more regression problems with the neural network.

In some embodiments, the method further includes maintaining a correctly fitted regression line for predicting the continuous quantities by the neural network. Maintaining the correctly fitted regression line includes periodically testing the integrity of the decision making by the neural network with the test data generated by the test data generator and programming the digital layer of the neural network to compensate for weight drifts in the synaptic weights of the analog layers of the neural network.

In some embodiments, the method further includes predicting discrete classes for one or more classification problems with the neural network.

In some embodiments, the method further includes maintaining a correctly projected decision boundary for predicting the discrete classes by the neural network. Maintaining the correctly projected decision boundary includes periodically testing the integrity of the decision making by the neural network with the test data generated by the test data generator and programming the digital layer of the neural network to compensate for weight drifts in the synaptic weights of the analog layers of the neural network.

DRAWINGS

Embodiments of this disclosure are illustrated by way of example and not by way of limitation in the figures of the accompanying drawings, in which like references indicate similar elements and in which.

DESCRIPTION

Terminology

Figure 1:
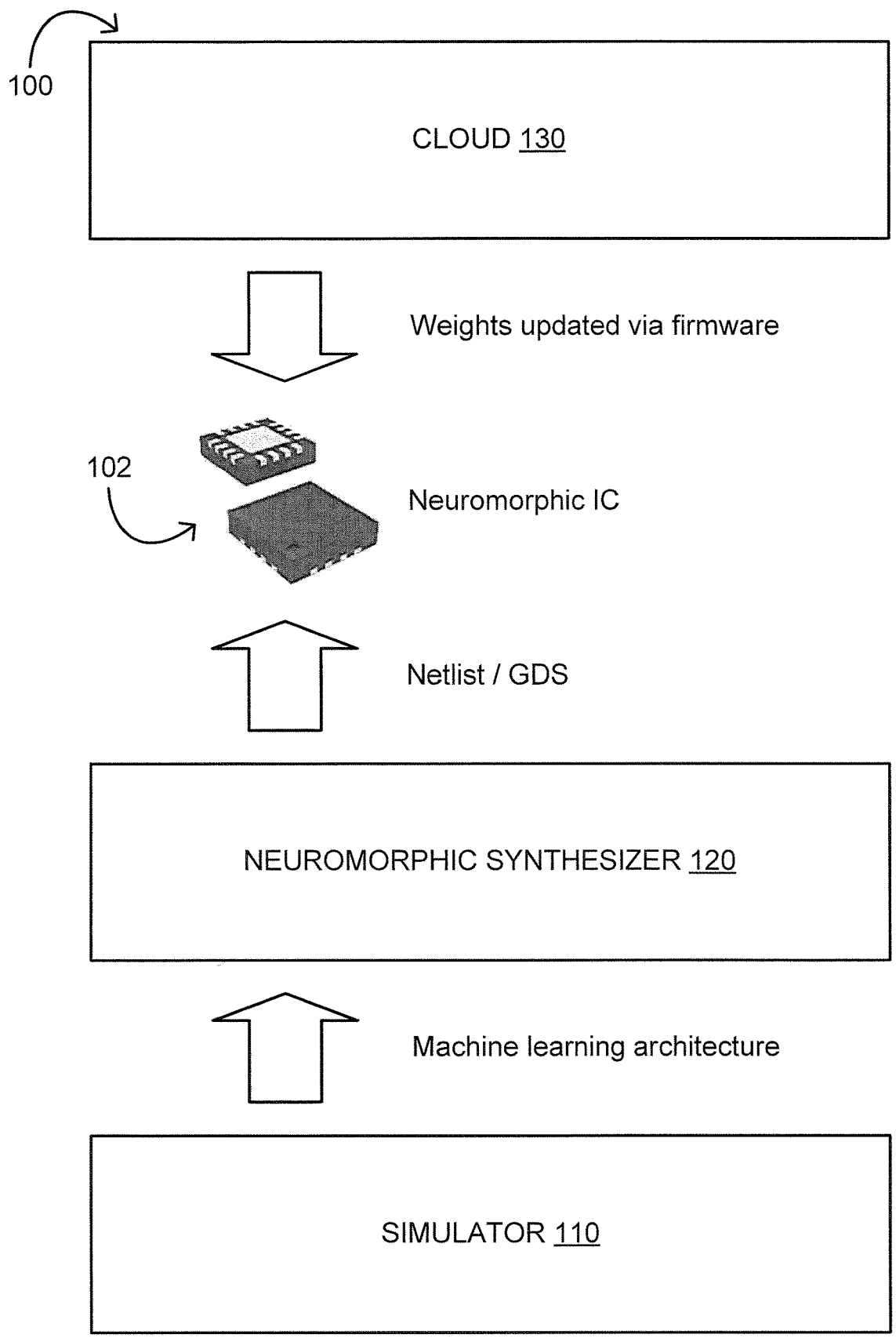
FIG. 1 illustrates a system 100 for designing and updating neuromorphic integrated circuits ("ICs") in accordance with some embodiments.

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to, a microprocessor, one or more processor cores, a programmable gate array, a microcontroller, a controller, an application specific integrated circuit, wireless receiver, transmitter and/or transceiver circuitry, semiconductor memory, or combinatorial logic.

The term "process" may include an instance of a computer program (e.g., a collection of instructions, also referred to herein as an application). In one embodiment, the process may be included of one or more threads executing concurrently (e.g., each thread may be executing the same or a different instruction concurrently).

The term "processing" may include executing a binary or script or launching an application in which an object is processed, wherein launching should be interpreted as placing the application in an open state and, in some implementations, performing simulations of actions typical of human interactions with the application.

The term "object" generally refers to a collection of data, whether in transit (e.g., over a network) or at rest (e.g., stored), often having a logical structure or organization that enables it to be categorized or typed. Herein, the terms "binary file" and "binary" will be used interchangeably.

The term "file" is used in a broad sense to refer to a set or collection of data, information or other content used with a computer program. A file may be accessed, opened, stored, manipulated or otherwise processed as a single entity, object or unit. A file may contain other files and may contain related or unrelated contents or no contents at all. A file may also have a logical format or be part of a file system having a logical structure or organization of plural files. Files may have a name, sometimes called simply the "filename," and often appended properties or other metadata. There are many types of files, such as data files, text files, program files, and directory files. A file may be generated by a user of a computing device or generated by the computing device. Access and/or operations on a file may be mediated by one or more applications and/or the operating system of a computing device. A filesystem may organize the files of the computing device of a storage device. The filesystem may enable tracking of files and enable access of those files. A filesystem may also enable operations on a file. In some embodiments the operations on the file may include file creation, file modification, file opening, file reading, file writing, file closing, and file deletion.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

FIG. 1 illustrates a system 100 for designing and updating neuromorphic integrated circuits ("ICs") is provided in accordance with some embodiments. As shown, the system 100 can include a simulator 110, a neuromorphic synthesizer 120, and a cloud 130 configured for designing and updating neuromorphic ICs such as neuromorphic IC 102. As further shown, designing and updating neuromorphic ICs can include creating a machine learning architecture with the simulator 110 based on a particular problem. The neuromorphic synthesizer 120 can subsequently transform the machine learning architecture into a netlist directed to the electronic components of the neuromorphic IC 102 and the nodes to which the electronic components are connected. In addition, the neuromorphic synthesizer 120 can transform the machine learning architecture into a graphic database system ("GDS") file detailing the IC layout for the neuromorphic IC 102. From the netlist and the GDS file for the neuromorphic IC 102, the neuromorphic IC 102, itself, can be fabricated in accordance with current IC fabrication technology. Once the neuromorphic IC 102 is fabricated, it can be deployed to work on the particular problem for which it was designed. While the initially fabricated neuromorphic IC 102 can include an initial firmware with custom synaptic weights between the neural nodes, the initial firmware can be updated as needed by the cloud 130 to adjust the weights. Being as the cloud 130 is configured to update the firmware of the neuromorphic IC 102, the cloud 130 is not needed for everyday use.

Neuromorphic ICs such as the neuromorphic IC 102 can be up to 100× or more energy efficient than graphics processing unit ("GPU") solutions and up to 280× or more energy efficient than digital CMOS solutions with accuracies meeting or exceeding comparable software solutions. This makes such neuromorphic ICs suitable for battery powered applications.

Neuromorphic ICs such as the neuromorphic IC 102 can be configured for application specific standard products ("ASSP") including, but not limited to, keyword spotting, voice recognition, one or more audio filters, speech enhancement, gesture recognition, image recognition, video object classification and segmentation, or autonomous vehicles including drones. For example, if the particular problem is one of image recognition (e.g., recognizing an image of a cat or a dog and classifying it as such), the simulator 110 can create a machine learning architecture with respect to one or more aspects of the image recognition. The neuromorphic synthesizer 120 can subsequently transform the machine learning architecture into a netlist and a GDS file corresponding to a neuromorphic IC for image recognition, which can be fabricated in accordance with current IC fabrication technology. Once the neuromorphic IC for image recognition is fabricated, it can be deployed to work on image recognition in a system or device in need of image recognition.

Neuromorphic ICs such as the neuromorphic IC 102 can be deployed in toys, sensors, wearables, augmented reality ("AR") systems or devices, virtual reality ("VR") systems or devices, mobile systems or devices, appliances, Internet-of-things ("IoT") devices, or hearing systems or devices.

Figure 2:
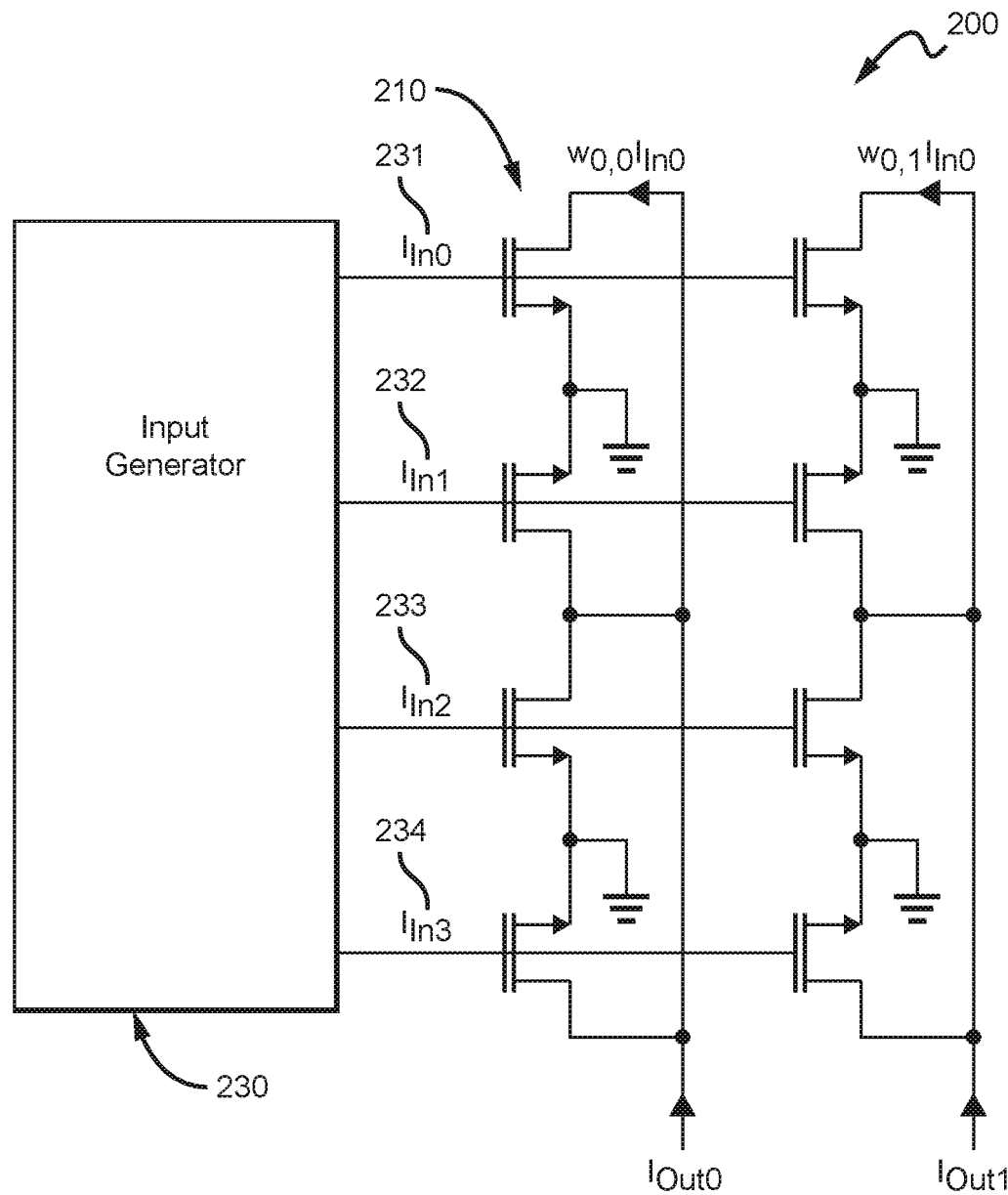
FIG. 2 illustrates an analog multiplier array in accordance with some embodiments.

FIG. 2 illustrates an analog multiplier array 200 is provided in accordance with some embodiments. Such an analog multiplier array can be based on a digital NOR flash array in that a core of the analog multiplier array can be similar to a core of the digital NOR flash array or the same as a core of the digital NOR flash array. That said, at least select and read-out circuitry of the analog multiplier array are different than a digital NOR array. For example, output current is routed as an analog signal to a next layer rather than over bit lines going to a sense-amp/comparator to be converted to a bit. Word-line analogs are driven by analog input signals rather than a digital address decoder. Furthermore, the analog multiplier array 200 can be used in neuromorphic ICs such as the neuromorphic IC 102. For example, a neural network can be disposed in the analog multiplier array 200 in a memory sector of a neuromorphic IC. However, as set forth herein, the neural network is not limited to the foregoing. The neural network can further include a digital layer in addition to analog layers of the neural network disposed in the analog multiplier array 200.

Since the analog multiplier array 200 is an analog circuit, input and output currents can vary in a continuous range instead of simply on or off. This is useful for storing weights of the neural network as opposed to digital bits; however, such weights are subject to weight drifts on account of, for example, electrostatic discharge from cells including transistors programmed with the weights. (See FIG. 4 and accompanying programming description.) In operation of the analog multiplier array 200, the weights are multiplied by input currents to provide output currents that are combined to arrive at a decision of the neural network. Should the analog layers of the neural network begin to arrive at incorrect decisions (e.g., incorrectly classifying one or more test images of cats to be dogs or incorrectly estimating a person's age from a photograph) on account of weight drifts in the analog layers of the neural network, the digital layer of the neural network can be programmed to correct for the weight drifts allowing the neural network to arrive at correct decisions (e.g., correctly classifying the one or more test images of the cats to be cats or correctly estimating a person's age from a photograph).

The analog multiplier array 200 can utilize standard programming and erase circuitry to generate tunneling and erase voltages.

Figure 3:
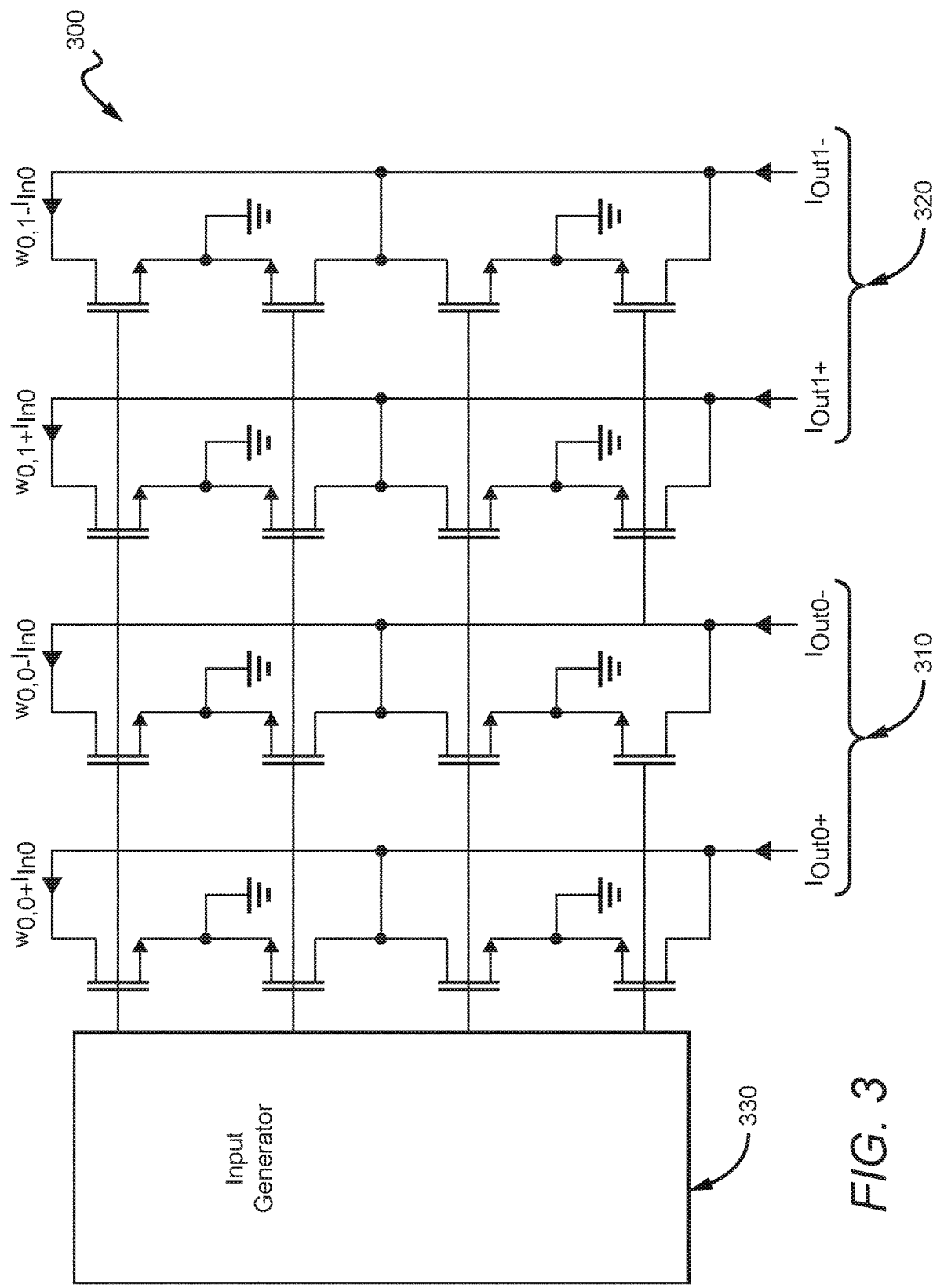
FIG. 3 illustrates an analog multiplier array in accordance with some embodiments.

FIG. 3 illustrates an analog multiplier array 300 is provided in accordance with some embodiments. The analog multiplier array 300 can use two transistors (e.g., a positive metal-oxide-semiconductor field-effect transistor ["MOSFET"] and a negative MOSFET) to perform a two-quadrant multiplication of a signed weight (e.g., a positive weight or a negative weight) and a non-negative input current value. If an input current value is multiplied by a positive or negative weight, the product or output current value can respectively be either positive or negative. A positively weighted product can be stored in a first column (e.g., column corresponding to $I_{Out0+}$ in the analog multiplier array 300), and a negatively weighted product can be stored in a second column (e.g., column corresponding to $I_{Out0-}$ in the analog multiplier array 300). The foregoing positively and negatively weighted products or output signals can be taken as a differential current value to provide useful information for making a decision (e.g., recognizing an image of a cat or a dog and classifying it as such).

Because each output current from the positive or negative transistor is wired to ground and proportional to the product of the input current value and the positive or negative weight, respectively, the power consumption of the positive or negative transistor is at or near zero when the input currents or weights are at or near zero. That is, if the input signals are '0,' or if the weights are '0,' then no power will be consumed by the corresponding transistors of the analog multiplier array 300. This is significant because in many neural networks, often a large fraction of the weights are '0,' especially after training. Therefore, energy is saved when there is nothing to do or going on. This is unlike differential pair-based multipliers, which consume a constant current (e.g., by means of a tail bias current) regardless of the input signal.

Figure 4:
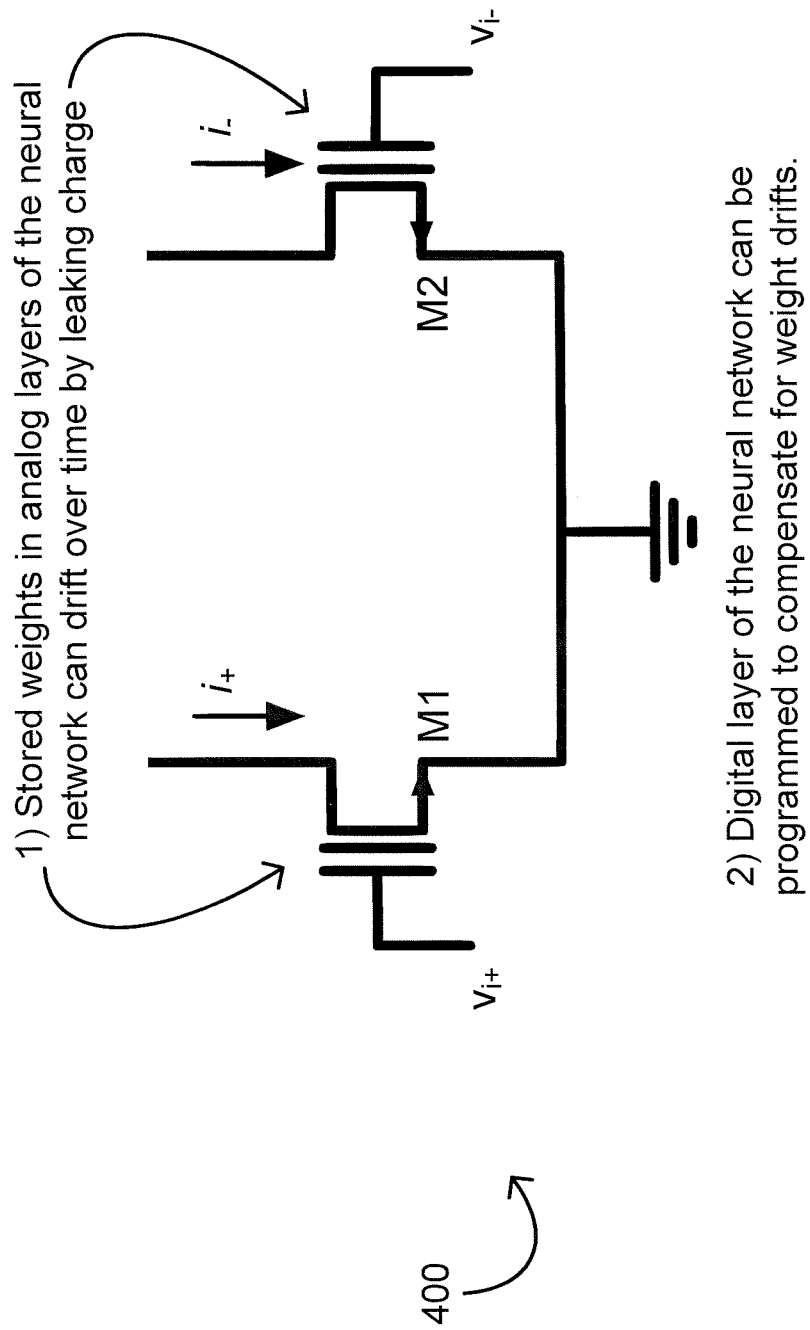
FIG. 4 illustrates a bias-free, two-quadrant multiplier of an analog multiplier array in accordance with some embodiments.

FIG. 4 illustrates a bias-free, two-quadrant multiplier 400 of an analog multiplier array such as the analog multiplier array 300 is provided in accordance with some embodiments. As set forth herein, because each output current from the positive transistor (e.g., M1 of the two-quadrant multiplier 400) or negative transistor (e.g., M2 of the two-quadrant multiplier 400) is proportional to the product of the input current value and the positive or negative weight, respectively, the power consumption of the positive or negative transistor is near zero when the input currents or weights are near zero. This is unlike differential pair-based multipliers, which consume a constant current (e.g., by means of a tail bias current) regardless of the input signal.

When programming a two-quadrant multiplier such as the bias-free, two-quadrant multiplier 400, it is common to erase each programmable cell (e.g., the cell including transistor M1 and the cell including transistor M2) thereof to set the cells to one extreme weight before setting each of the cells to its target weight. Extending this to a full array such as the analog multiplier array 300, all of the programmable cells in the full array are set to one extreme weight before setting each of the cells to its target weight. However, such weights are subject to weight drifts on account of, for example, electrostatic discharge from cells including the transistors programmed with the weights. As set forth herein, such weight drifts in the analog layers of the neural network can cause the neural network to arrive at incorrect decisions (e.g., incorrectly classifying one or more test images of cats to be dogs or incorrectly estimating a person's age from a photograph). For this reason, the digital layer of the neural network is provided to correct the weight drifts in order for the neural network to arrive at correct decisions (e.g., correctly classifying the one or more test images of the cats to be cats or correctly estimating a person's age from a photograph). In this way, the analog layers of the neural network need not be reprogrammed with the initially programmed target weights.

Figure 5:
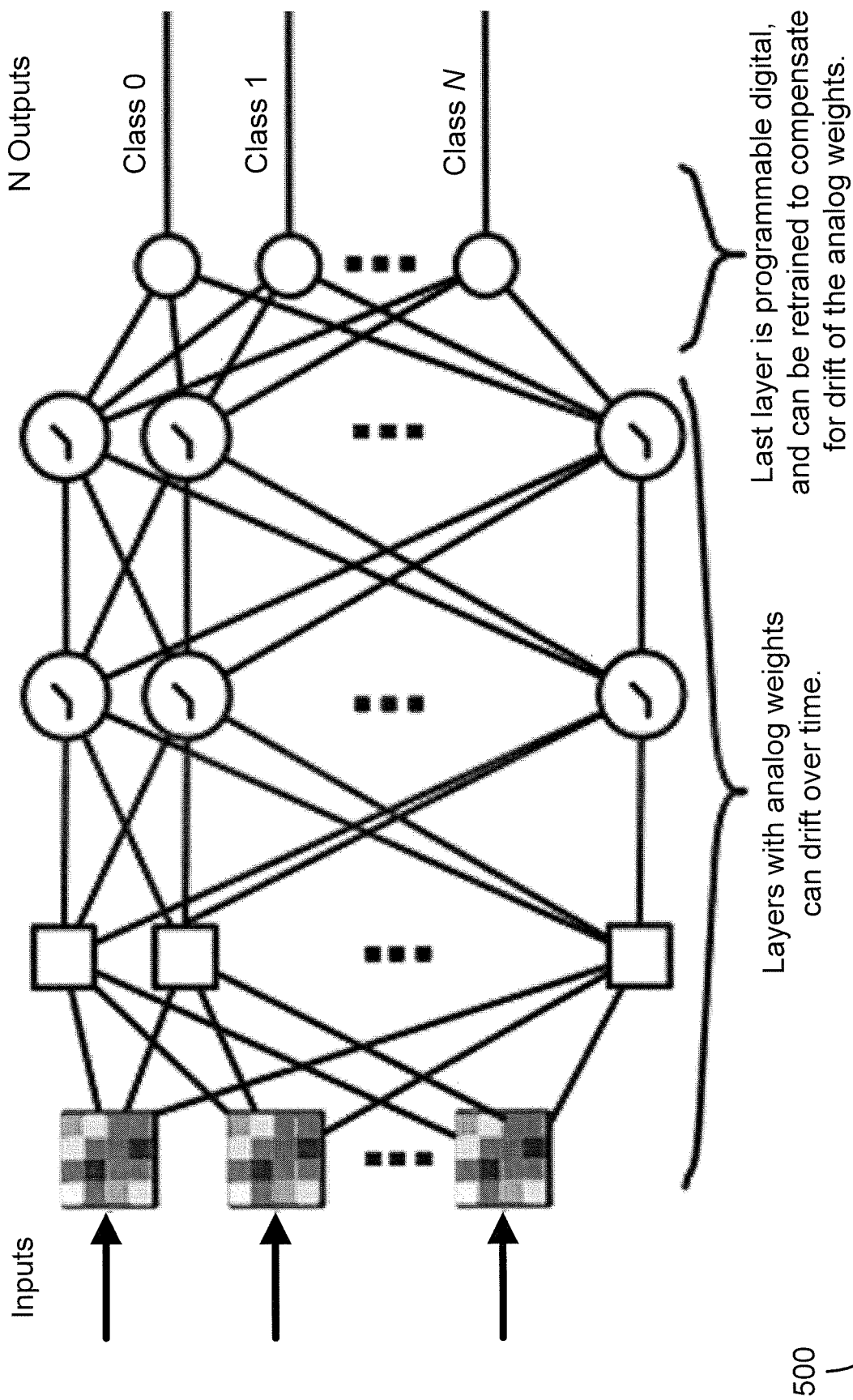
FIG. 5 illustrates a hybrid analog-digital neural network in accordance with some embodiments.

FIG. 5 illustrates a multi-layered hybrid analog-digital neural network 500 in accordance with some embodiments. As shown, the hybrid neural network 500 includes a number of data inputs, a number of analog layers, a digital layer, and a number of data outputs. The number of analog layers is disposed between the number of data inputs and the digital layer. The digital layer is disposed between the number of analog layers and a number of data outputs. Programmable cells including transistors (e.g., cells including transistors M1 and M2 of FIG. 4) in the number of analog layers can be programmed with an initial set of weights as set forth herein for one or more classification problems, one or more regression problems, or a combination thereof. During operation of the number of analog layers, which are disposed in an analog multiplier array (e.g., the analog multiplier array 300), the weights are multiplied by input currents to provide output currents that are combined to arrive at a decision of the hybrid neural network 500 by means of one or more of the number of data outputs. Decision making for the regression problems includes predicting continuous quantities corresponding to data input into the number of data inputs (e.g., estimating a person's age from a photograph). Decision making for the classification problems includes predicting discrete classes corresponding to data input into the number of data inputs (e.g., classifying an image as an image of a cat or a dog).

But weight drifts occurring via electrostatic discharge from the cells can cause the number of analog layers of the hybrid neural network 500 to begin to arrive at incorrect decisions (e.g., incorrectly classifying one or more test images of cats to be dogs or incorrectly estimating a person's age from a photograph), which incorrect decisions can be tested for on a periodic basis with test data (e.g., test images of the cats and dogs or test images of people of known ages) such as generated test data provided by a test data generator. When the incorrect decisions of the hybrid neural network 500 become known, the digital layer of the hybrid neural network 500 can be programmed through a partial digital retraining process to correct or compensate for the weight drifts, which allows the hybrid neural network 500 to arrive at correct decisions (e.g., correctly classifying the one or more test images of the cats to be cats or correctly estimating a person's age from a photograph) again. This maintains the integrity of the decision making by the hybrid neural network 500.

As such, the foregoing provides a neuromorphic IC in which low-power analog circuits implement the early layers of a neural network (e.g., the hybrid neural network 500) while configurable digital circuits implement the later layers of the neural network in order to facilitate a convenient adjustment of the weights in the later layers to mitigate degradation in stored weights, customize the neural network for classification to specific targets, customize the neural network for predictions of continuous quantities, or a combination thereof. As a consequence, a required rate of full refresh for a neural network such as the hybrid neural network 500 can be reduced or even eliminated.

Figure 6A:
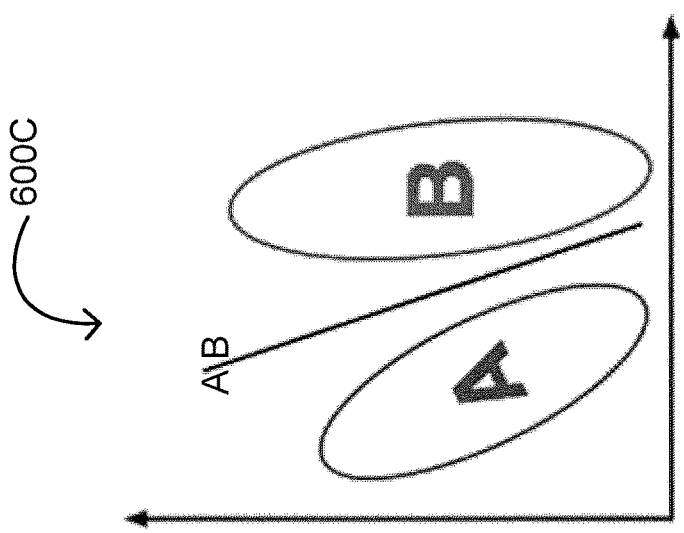
FIG. 6A illustrates a first decision-boundary plot correctly classifying data along a decision boundary A-B in accordance with some embodiments.
Figure 6B:
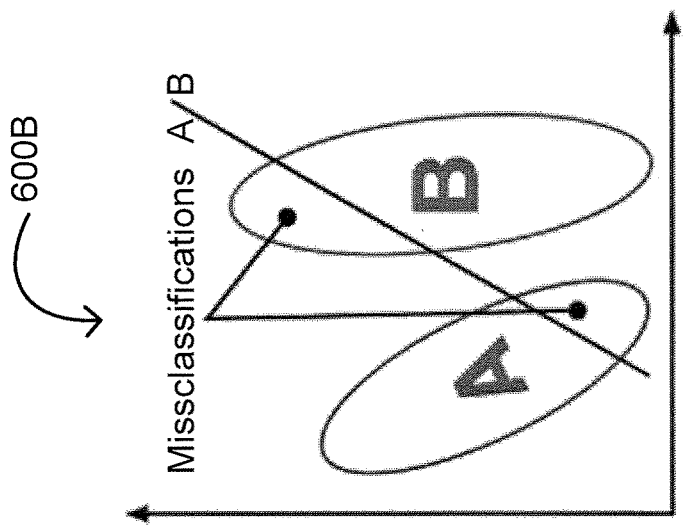
FIG. 6B illustrates a second decision-boundary plot incorrectly classifying data along a decision boundary A-B as a result of weight drifts in accordance with some embodiments.
Figure 6C:
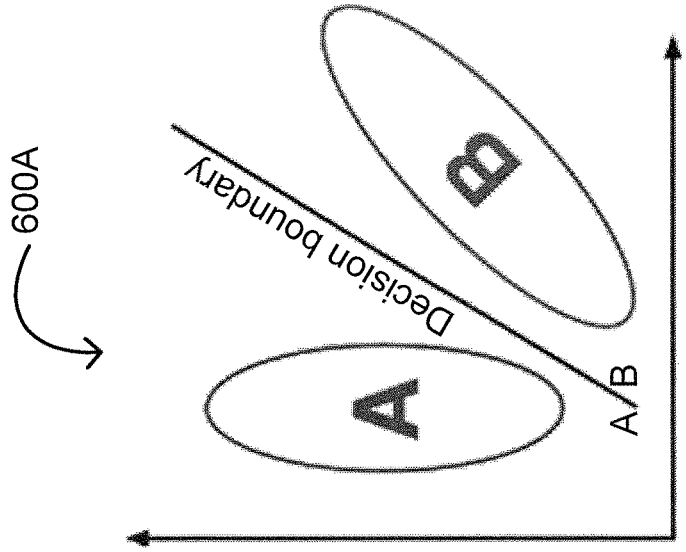
FIG. 6C illustrates a third decision-boundary plot correctly classifying data along a decision boundary A-B after partial digital retraining in accordance with some embodiments.

FIGS. 6A-6C illustrate the effect of weight drifts on decisions of the analog layers of a hybrid neural network such as the hybrid neural network 500, as well as subsequent correction of the decisions by partial digital retraining of the digital layer of the hybrid neural network 500. Test images of cats and dogs are referenced herein as an example of image recognition for which an artificial neural network such the hybrid neural network 500 is able to classify the test images as either cat images or dog images. With respect to FIGS. 6A-6C, test images of cats correspond to A-type data belonging to group A, and test images of dogs correspond to B-type data belonging to group B.

FIG. 6A illustrates a first decision-boundary plot 600A correctly classifying data along a decision boundary A-B in accordance with some embodiments. As shown, the decision boundary A-B in the first decision-boundary plot 600A correctly delimits all A-type data (e.g., cat images) belonging to group A (e.g., group of cat images) and all B-type data (e.g., dog images) belonging to group B (e.g., group of dog images) in a first set of test images. Such a scenario can occur after i) programming cells including transistors such as transistors M1 and M2 of FIG. 4 in the number of analog layers of the hybrid neural network 500 with an initial set of weights and ii) subsequently testing the hybrid neural network 500 with the first set of test images.

FIG. 6B illustrates a second decision-boundary plot 600B incorrectly classifying data along a decision boundary A-B as a result of weight drifts in accordance with some embodiments. As shown, the decision boundary A-B in the second decision-boundary plot 600B incorrectly delimits the A-type data (e.g., cat images) belonging to group A (e.g., group of cat images) and the B-type data (e.g., dog images) belonging to group B (e.g., group of dog images) in a second set of test images different from the first set of images. That is, some of the A-type data (e.g., cat images) belonging to group A (e.g., group of cat images) is incorrectly classified as B-type data, and some of the B-type data (e.g., dog images) belonging to group B (e.g., group of dog images) is incorrectly classified as A-type data. Such a scenario can result from weight drifts on account of, for example, electrostatic discharge from the cells including the transistors programmed with the initial set of weights.

FIG. 6C illustrates a third decision-boundary plot correctly classifying data along a decision boundary A-B after partial digital retraining in accordance with some embodiments. As shown, the decision boundary A-B in the third decision-boundary plot 600C correctly delimits all A-type data (e.g., cat images) belonging to group A (e.g., group of cat images) and all B-type data (e.g., dog images) belonging to group B (e.g., group of dog images) in the second set of test images. Such a scenario can occur after i) partial digital retraining of the digital layer of the hybrid neural network 500 to compensate for the foregoing weight drifts and ii) subsequently testing the hybrid neural network 500 with the second set of test images. In addition, subsequent to the partial digital retraining of the hybrid neural network 500 for the second set of test images, the hybrid neural network 500 should also be able to correctly delimit all A-type data (e.g., cat images) belonging to group A (e.g., group of cat images) and all B-type data (e.g., dog images) belonging to group B (e.g., group of dog images) in the first set of test images. If not, the hybrid neural network 500 can be subjected to further partial digital retraining until all such data is correctly delimited.

As such, decision making by the hybrid neural network 500 can include predicting discrete classes for one or more classification problems. The digital layer through its configuration for programmatically compensating for weight drifts of the synaptic weights of the hybrid neural network 500 is, thus, further configured to maintain a correctly projected decision boundary for predicting the discrete classes by the hybrid neural network 500.

Figure 7A:
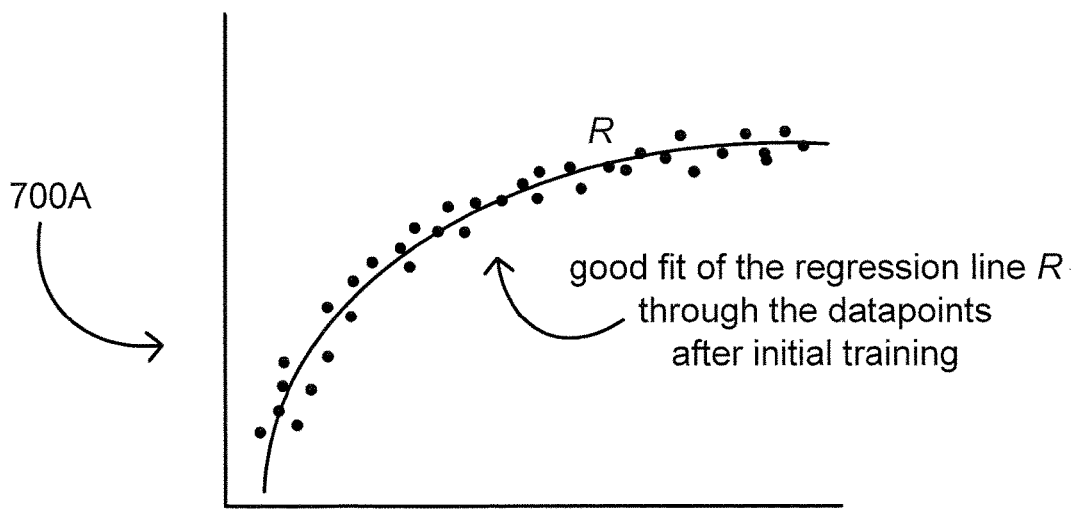
FIG. 7A illustrates a plot in which a regression line provides a good fit for datapoints of the plot in accordance with some embodiments.
Figure 7B:
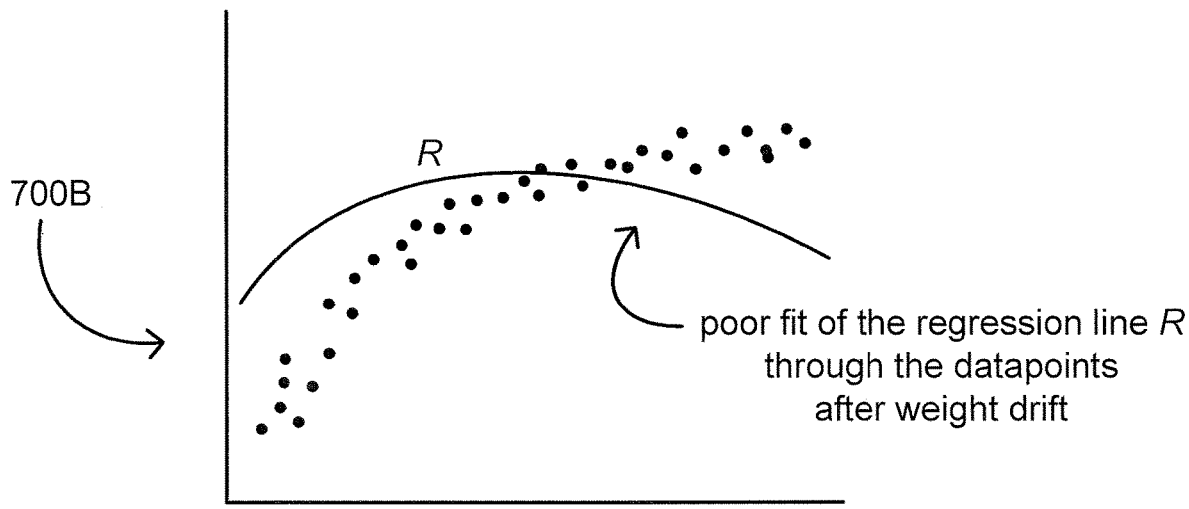
FIG. 7B illustrates the plot in which the regression line R poorly fits the datapoints of the plot due to weight drift or other degradation in accordance with some embodiments.
Figure 7C:
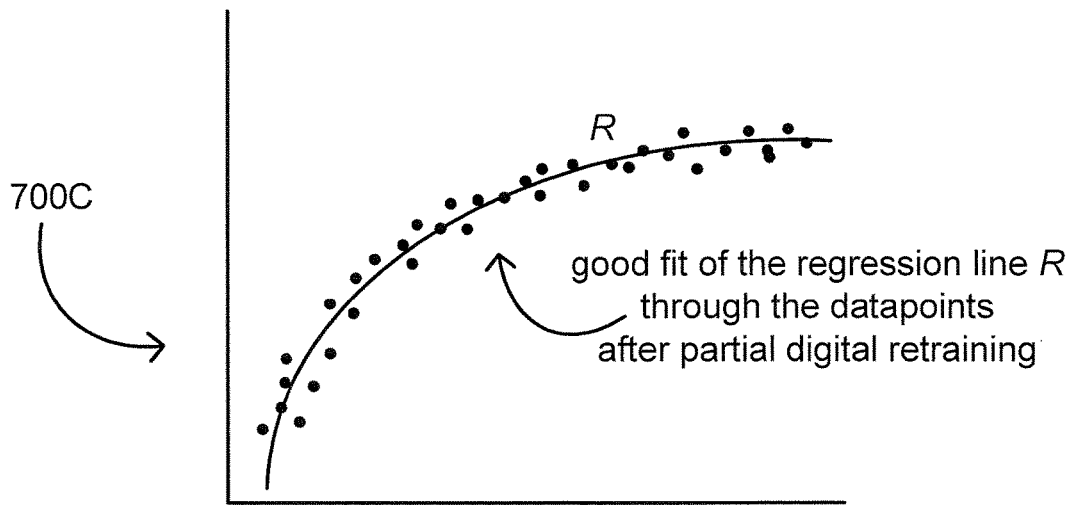
FIG. 7C illustrates a plot in which a regression line provides a good fit for datapoints of the plot after partial digital retraining in accordance with some embodiments.

FIGS. 7A-7C illustrate the same plot in which regression lines differentially fit datapoints of the plot. FIG. 7A illustrates the plot in which the regression line R provides a good fit for the datapoints of the plot in accordance with some embodiments. However, FIG. 7B illustrates the plot in which the regression line R poorly fits the datapoints of the plot in accordance with some embodiments, due to weight drift or other degradation. FIG. 7C illustrates the plot in which the digital layer compensates for weight drift and the regression line R achieves a good fit with the datapoints of the plot in accordance with some embodiments. Poor fitting of the regression line R as in FIG. 7B can result from weight drifts on account of, for example, electrostatic discharge from the cells including the transistors programmed with the initial set of weights. Partial digital retraining of the digital layer of the hybrid neural network 500 can compensate for the foregoing weight drifts.

As such, the decision making by the hybrid neural network 500 can include predicting continuous quantities for one or more regression problems. The digital layer through its configuration for programmatically compensating for weight drifts of the synaptic weights of the hybrid neural network 500 is, thus, further configured to maintain a correctly fitted regression line for predicting the continuous quantities by the hybrid neural network 500.

In order to test a hybrid neural network such as the hybrid neural network 500, a test data generator can be built into the neuromorphic IC (e.g., the neuromorphic IC 102) including the hybrid neural network, and the test data generator can be configured to generate test data for testing (e.g., classification testing or regression testing) the hybrid neural network 500. For example, the test data generator can be configured to generate a set of signals or data that the hybrid neural network 500 should classify as 'C'-type data, but just barely. Such a set of data can be used to determine or trace out edges of the set of data for validation of the hybrid neural network 500. The test data generator can be configured to generate the test data for testing with any desired frequency including, but not limited to, once an hour or once a day for measuring an accuracy of the hybrid neural network 500 and subsequent partial digital retraining, if needed.

Methods

A method for the neuromorphic integrated circuit includes, in some embodiments, programming synaptic weights of a number of analog layers of a multi-layered analog-digital hybrid neural network of the neuromorphic integrated circuit for decision making by the neural network; periodically testing an integrity of the decision making by the neural network using test data generated by a test data generator of the neuromorphic integrated circuit; and programming a digital layer of the neural network to compensate for weight drifts in the synaptic weights of the analog layers of the neural network, thereby maintaining integrity of the decision making by the neural network.

The method can further include predicting continuous quantities for one or more regression problems with the neural network. Predicting the continuous quantities by the neural network includes maintaining a correctly fitted regression line for predicting the continuous quantities by the neural network. Maintaining the correctly fitted regression line includes periodically testing the integrity of the decision making by the neural network with the test data generated by the test data generator and programming the digital layer of the neural network to compensate for weight drifts in the synaptic weights of the analog layers of the neural network.

The method can further include predicting discrete classes for one or more classification problems with the neural network. Predicting the discrete classes by the neural network includes maintaining a correctly projected decision boundary. Maintaining the correctly projected decision boundary includes periodically testing the integrity of the decision making by the neural network with the test data generated by the test data generator and programming the digital layer of the neural network to compensate for weight drifts in the synaptic weights of the analog layers of the neural network.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A neuromorphic integrated circuit, comprising: a multi-layered analog-digital hybrid neural network comprising a plurality of analog layers configured to include synaptic weights between neural nodes of the neural network for decision making by the neural network; wherein a positively weighted product may be stored in a first column of an analog multiplier array, and a negatively weighted product can be stored in a second column of the analog multiplier array; and at least one digital layer; wherein the digital layer is configured for programmatically compensating for weight drifts of the synaptic weights of the neural network, thereby maintaining integrity of the decision making by the neural network; and wherein the plurality of analog layers is disposed between a plurality of data inputs and the digital layer, and wherein the digital layer is disposed between the plurality of analog layers and a plurality of data outputs, wherein the positively and negatively weighted products can be taken as a differential current value.

2. The neuromorphic integrated circuit of claim 1, wherein the neural network is configured for one or more classification problems, one or more regression problems, or a combination thereof.

3. The neuromorphic integrated circuit of claim 2, wherein the decision making by the neural network includes predicting continuous quantities for one or more regression problems.

4. The neuromorphic integrated circuit of claim 2, wherein the decision making by the neural network includes predicting discrete classes for one or more classification problems.

5. The neuromorphic integrated circuit of claim 1, further comprising: a test data generator configured to generate test data on a periodic basis for testing the integrity of the decision making by the neural network.

6. The neuromorphic integrated circuit of claim 1, wherein the analog multiplier array of two-quadrant multipliers in a memory sector of the neuromorphic integrated circuit.

7. The neuromorphic integrated circuit of claim 1, wherein the neuromorphic integrated circuit is configured to operate on battery power.

8. A neuromorphic integrated circuit, comprising: a multi-layered analog-digital hybrid neural network including a plurality of analog layers configured to include synaptic weights between neural nodes of the neural network for decision making by the neural network, and at least one digital layer, wherein a positively weighted product may be stored in a first column of an analog multiplier array, and a negatively weighted product can be stored in a second column of the analog multiplier array; and wherein the digital layer is configured for programmatically compensating for weight drifts of the synaptic weights of the neural network, thereby maintaining integrity of the decision making by the neural network; a test data generator configured to generate test data on a periodic basis for testing the integrity of the decision making by the neural network; and wherein the plurality of analog layers is disposed between a plurality of data inputs and the digital layer, and wherein the digital layer is disposed between the plurality of analog layers and a plurality of data outputs.

9. The neuromorphic integrated circuit of claim 8, wherein the decision making by the neural network includes predicting continuous quantities for one or more regression problems.

10. The neuromorphic integrated circuit of claim 8, wherein the decision making by the neural network includes predicting discrete classes for one or more classification problems.

11. The neuromorphic integrated circuit of claim 8, wherein the analog multiplier array comprises two-quadrant multipliers in a memory sector of the neuromorphic integrated circuit.

12. The neuromorphic integrated circuit of claim 8, wherein the neuromorphic integrated circuit is configured for one or more application specific standard products ("ASSPs") selected from keyword spotting, voice recognition, one or more audio filters, speech enhancement, gesture recognition, image recognition, video object classification and segmentation, and autonomous vehicles including drones.

13. The neuromorphic integrated circuit of claim 12, wherein the neuromorphic integrated circuit is configured to operate on battery power.

14. A method for a neuromorphic integrated circuit, comprising: programming synaptic weights of a plurality of analog layers of a multi-layered analog-digital hybrid neural network of the neuromorphic integrated circuit for decision making by the neural network; periodically testing an integrity of the decision making by the neural network using test data generated by a test data generator of the neuromorphic integrated circuit; programming a digital layer disposed after a last analog layer of the neural network to compensate for weight drifts in the synaptic weights of the analog layers of the neural network, thereby maintaining integrity of the decision making by the neural network; and wherein a positively weighted product may be stored in a first column of an analog multiplier array, and a negatively weighted product can be stored in a second column of the analog multiplier array.

15. The method of claim 14, further comprising: predicting continuous quantities for one or more regression problems with the neural network.

16. The method of claim 14, further comprising: predicting discrete classes for one or more classification problems with the neural network.

* * * * *